United States Patent
Kloth et al.

(10) Patent No.: US 8,335,231 B2
(45) Date of Patent: Dec. 18, 2012

(54) HARDWARE BASED ZONING IN FIBRE CHANNEL NETWORKS

(75) Inventors: Raymond J. Kloth, Saratoga, CA (US); Sujatha V. Sundararaman, Milpitas, CA (US); Ravi K. Nimmagadda, Santa Clara, CA (US); Sriharsha Jayanarayana, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 1113 days.

(21) Appl. No.: 11/147,715

(22) Filed: Jun. 7, 2005

(65) Prior Publication Data

US 2006/0251111 A1  Nov. 9, 2006

(30) Foreign Application Priority Data

Apr. 8, 2005 (IN) .............................. 902/DEL/2005

(51) Int. Cl.
*H04J 3/00* (2006.01)
(52) U.S. Cl. ...................................................... 370/464
(58) Field of Classification Search .................. 370/389, 370/395.31, 235, 464; 711/163
See application file for complete search history.

(56) References Cited

U.S. PATENT DOCUMENTS

| | | | | |
|---|---|---|---|---|
| 7,167,472 B2* | 1/2007 | Wu et al. | ........................ | 370/389 |
| 7,248,580 B2* | 7/2007 | George et al. | ................. | 370/389 |
| 2002/0126667 A1* | 9/2002 | Oguchi | ......................... | 370/389 |
| 2005/0018673 A1* | 1/2005 | Dropps et al. | ................ | 370/389 |
| 2005/0030954 A1* | 2/2005 | Dropps et al. | ........... | 370/395.31 |
| 2005/0281196 A1* | 12/2005 | Tornetta et al. | ............... | 370/235 |
| 2006/0036822 A1* | 2/2006 | Kaji | ............................. | 711/163 |

OTHER PUBLICATIONS

Cisco Systems, Inc., Using VSANs and Zoning in the Cisco MDS 9000 Family of Multilayer Fibre Channel Switches, www.cisco.com, prior to Feb. 10, 2005, 11 pages.

* cited by examiner

*Primary Examiner* — Mark Rinehart
*Assistant Examiner* — Gbemileke Onamuti
(74) *Attorney, Agent, or Firm* — Weaver Austin Villeneuve & Sampson LLP

(57) ABSTRACT

Provided are methods and apparatus that enforce zoning rules by separately employing source and destination information. In certain embodiments, information uniquely identifying network destinations is provided on a destination CAM. In these embodiments, each destination identified in the destination CAM has an associated zoning decision vector provided in a results memory. The vector provides specific zoning decisions (permit or deny transmission) for specific sources on the network. The specific zoning decision to be applied to a frame under consideration is selected from a zoning decision vector by using source information taken from the frame.

28 Claims, 9 Drawing Sheets

HARDWARE BASED ZONING IN FIBRE CHANNEL NETWORKS

BACKGROUND

1. Field of the Invention

The present invention relates to storage area networks and, more particularly, to implementing zones in networks such as Fibre Channel networks.

2. Background of the Invention

Storage area networks or SANs provide an increasingly important mechanism for making shared storage available to multiple hosts. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the materials on Fibre Channel provided by the Technical Committee T11, which is the committee within INCITS responsible for Device Level Interfaces (www.T11.org), all incorporated by reference herein for all purposes.

Fibre Channel based SANs are often organized into zones. Within each zone, Hosts can see and access only storage devices or other hosts belonging to that zone. This allows the coexistence on the same SAN of different computing environments. For example, it is possible to define on a SAN a Unix zone and a separate Windows zone. Unix servers in the Unix zone may access only storage or hosts devices within the Unix zone, and do not interfere with the other devices connected to the SAN. In the same manner, Windows servers belonging to the Windows zone may access storage or host devices only within the Windows zone, without interfering with the other devices connected to the SAN. In another example, one zone may be defined for an engineering group and a second zone may be defined for a human resources group within a single company. The SAN administrator is responsible for defining the particular zones in a SAN, as required or dictated by the computing and storage resources connected to it. The Switching Fabric allows communications only between devices belonging to the same zone, preventing a device of one zone from seeing or accessing a device of another zone. A host for example can access a storage device in another zone only if that storage device happens to also be in the same zone as the host.

In large storage area networks having many hosts and storage devices, it can be particularly challenging to efficiently implement zoning. It would be desirable to have more advanced zoning implementations to meet this challenge.

SUMMARY

Provided are methods and apparatus that enforce zoning rules without employing a device listing all possible source-destination combinations in a network. Rather, the provided methods and apparatus employ source and destination information separately. In certain embodiments, information uniquely identifying network destinations is provided on a destination Content Addressable Memory (CAM). In these embodiments, each destination identified in the destination CAM has an associated zoning decision vector provided in a results memory. The vector provides specific zoning decisions (permit or deny transmission) for specific sources on the network. A specific zoning decision to be applied to a frame under consideration is selected from a zoning decision vector by using source information taken from the frame. Thus, a zoning decision is made by applying frame destination information to a destination CAM and applying frame source information to a zoning decision vector (which was selected using the destination CAM).

In certain embodiments, a network device is provided, which includes one or more ports and a zoning engine for implementing zoning in a network. The zoning engine includes at least the following features: (a) a content addressable memory configured or designed to store information identifying distinct destinations on the network; (b) a membership table designed or configured to store zoning decision vectors for the distinct destinations identified in the content addressable memory; and (c) logic for (i) selecting a zoning decision vector from the membership table using destination information from an incoming frame, and (ii) selecting a zoning rule from the selected zoning decision vector using source information from the incoming frame. Zoning decision vectors include a separate zoning rule for multiple sources on the network. In certain embodiments, the network is a Fibre Channel network and the ports are Fibre Channel ports. Further, the information identifying distinct destinations may be Fibre Channel destination IDs (fc_dids) or portions thereof. Still further, membership in a Virtual Storage Area Network (VSAN) may be part of the source information and/or the destination information, which information may include other components such as fc_ids.

In certain embodiments, the network device that implements zoning has multiple Fibre Channel ports and the zoning engine implements zoning for one or more of these ports, and in certain embodiments two or more of the ports. The zoning engine may implement zoning for one or more Fibre Channel ports at ingress or egress points on the Fibre Channel network, preferably ingress points for many applications. Further, in certain embodiments, the zoning engine implements zoning on at least one port that supports an arbitrated loop. In certain embodiments where loop devices are supported, the network device contains logic for providing one set of source parameters for loop sources and a second set of source parameters for non-loop sources. For example, the ALPA portion of a loop address may be specifically employed for loop sources.

The zoning engine may also include an equivalency table for mapping individual sources on the network to equivalency classes, where an equivalency class defines a group of sources having the same zoning rule for all destinations across the network, and where the zoning decision vectors specify at least some zoning decisions for equivalency classes. In such cases, the zoning decision vector may specify zoning decisions for equivalency classes.

Note that the concepts of source information and destination information, which are employed to make zoning decisions, encompass various types of information that may be taken from a frame (e.g., fc_sid, fc_did, VSAN number, ALPA, etc.) as well as other information such as the port from which a frame originated. The amount and type of information used as source information and destination information is chosen based on the design and function of the network employing the zoning engine. In some cases, multiple pieces of information will be employed (e.g., port number, fc_id, and VSAN number) and in other cases it may be sufficient to employ only a single piece of information (e.g., a fc_id).

Note also that the invention may be implemented as a distributed system when populated at each port or group of ports, and thus can be used to store a distributed database (the same database is not generally populated in each instance, as an instance is local to a particular group of ports). This allows scalability in systems with extremely high port counts, whereas a central system would not.

Also provided are methods of implementing zoning in a network (e.g., a Fibre Channel network). The method may be characterized by the following operations: (a) receiving a Fibre Channel frame and determining source information and destination information from the frame; (b) using the destination information to identify a zoning decision vector for the destination specified in said frame; (c) using the source information to identify in the zoning decision vector a zoning decision for the source specified in said frame; and (d) applying the zoning decision to the frame. As indicated, the source and/or destination information may include membership in a Virtual Storage Area Network implemented on the network. Further, determining source information may involve determining whether the source is a loop device. Still further, the method may also determine an equivalency class to which the source belongs.

Also provided are networks or portions of networks having the following features: a source for sending frames; a destination for receiving frames; and a switch including: (a) a content addressable memory configured or designed to store information identifying distinct destinations on the network; (b) a membership table designed or configured to store zoning decision vectors for the distinct destinations identified in the content addressable memory; and (c) logic for (i) selecting a zoning decision vector from the membership table using destination information from an incoming frame, and (ii) selecting a zoning rule from the selected zoning decision vector using source information from the incoming frame. In certain embodiments, the network includes two or more VSANs. In certain embodiments, the switch implements zoning at an ingress point on the network.

In this network embodiment, the switch may also include an equivalency table designed or configured for mapping individual sources on the network to equivalency classes. When an equivalency table is used, the zoning decision vectors may specify zoning decisions for the equivalency classes.

Also disclosed are methods of implementing zoning in a network or a portion of the network. Such methods may be characterized by the following operations: (a) sending a frame from a source to an ingress port on a switch, where the frame identifies a destination on the network; (b) making a zoning decision at the switch by (i) identifying a zoning decision vector for the destination identified in the frame, and (ii) identifying in the zoning decision vector a zoning decision for the source; and (c) permitting or denying transmission of the frame to the destination based on the zoning decision identified in (b). Such methods may employ loop devices, VSANs, and/or equivalency classes as generally suggested above.

These and other features and advantages of the present invention will be described in more detail below with reference to associated drawings.

DETAILED DESCRIPTION OF THE PREFERRED EMBODIMENTS

The described zoning apparatus and methods may be implemented in many different ways. Specific examples are presented herein and should not be viewed as limiting. Generally, the invention employing apparatus and methods for enforcing zoning rules provided by a network administrator or other source. These rules are implemented in a manner that makes efficient use of memory and other hardware resources and requires relatively minimal computational overhead. In some embodiments, the zoning apparatus employs a destination CAM, which identifies all or many destination on a network, a membership table, which contains zoning decision vectors for the destinations provided in the destination CAM, and a mechanism for selecting a specific zoning decision from the vector based on the source sending a frame under consideration for zoning.

Figure 1:
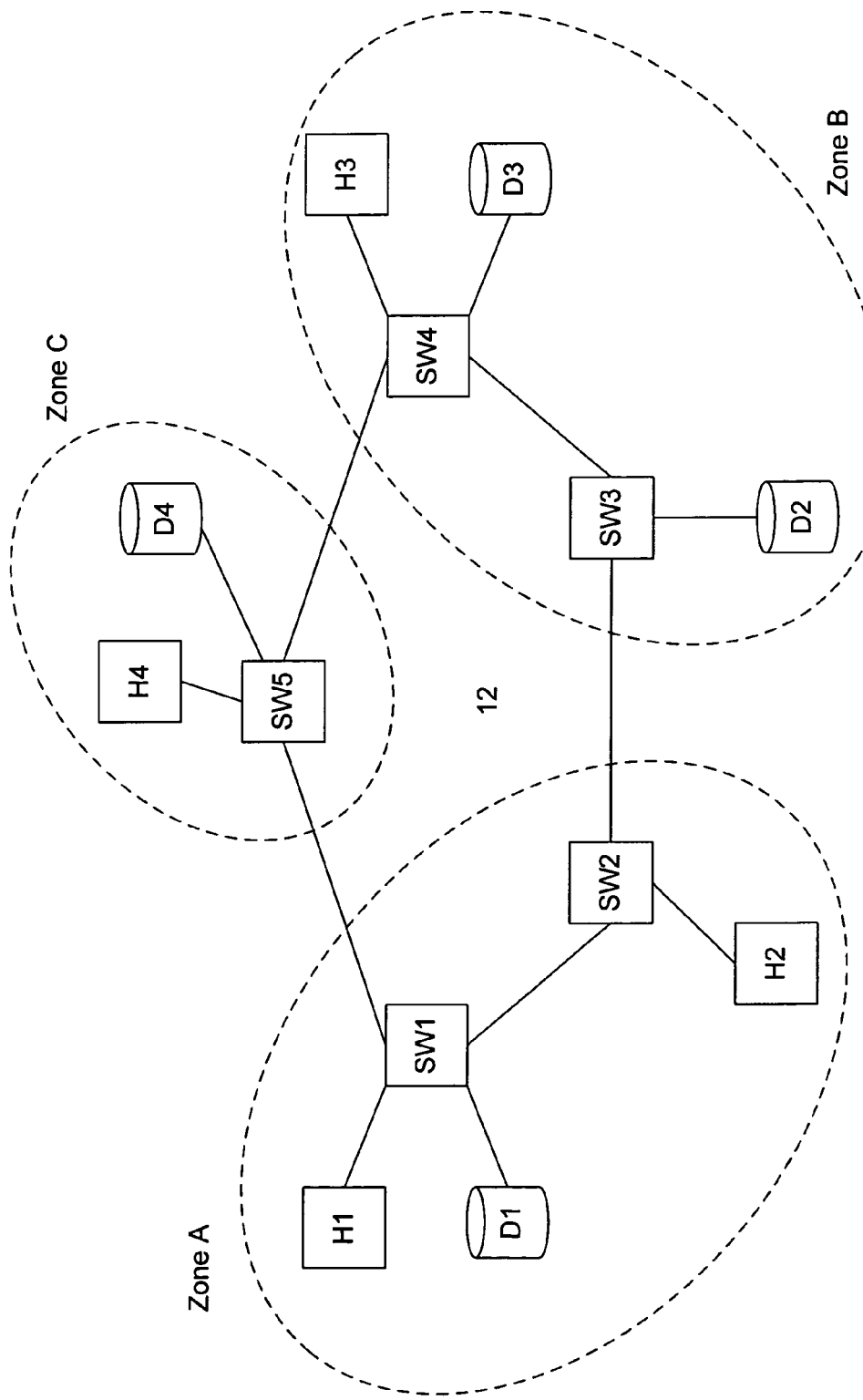
FIG. 1 shows an exemplary Storage Area Network according to the present invention.

Referring to FIG. 1 for context, an exemplary Storage Area Network (SAN) according to an embodiment of the present invention is shown. A storage area network (SAN) 10 includes a Switching Fabric 12 that includes a plurality of Fibre Channel Switches SW1 through SW5. Also included in the SAN 10 are a plurality of hosts H1 through H4 and a plurality of storage devices D1 through D4. According to embodiments of the invention, the hosts can be any type of host including but not limited to servers or personal computers running on the Unix, Windows or any other computing platform. Similarly, the storage devices D1-D4 can be any type of storage device including but not limited to tape back-up systems, emulated tape back-up systems, CD-ROM storage arrays, or one or more disks such as a Redundant Array of Independent Disks (RAID). The Switches SW1-SW5 can be any type of Fibre Channel Switch such as those commercially available from Cisco Systems of San Jose, Calif.

As depicted in FIG. 1, the hosts H and storage devices D are arranged into three zones. The members of zone A include hosts H1 and H2 and storage disk D1. The members of zone B include host H3 and storage devices D2 and D3. The members of zone C include host H4 and storage device D4. The individual zones are typically established on the basis of the operating systems used, and so they can be either Unix zones, Windows zones, or some other type of computing platform zone, but they can be defined also on the basis of other requirements such as departments within an organization (e.g., Human Resources, Engineering, Upper Management, etc.). Although not depicted, zones can also overlap with one another. It should be noted that the number and types of hosts H, storage devices D, and Switches SW, and their particular arrangement in the zones A, B and C as shown is merely illustrative. In no way should this example be construed as limiting the invention.

Figure 2:
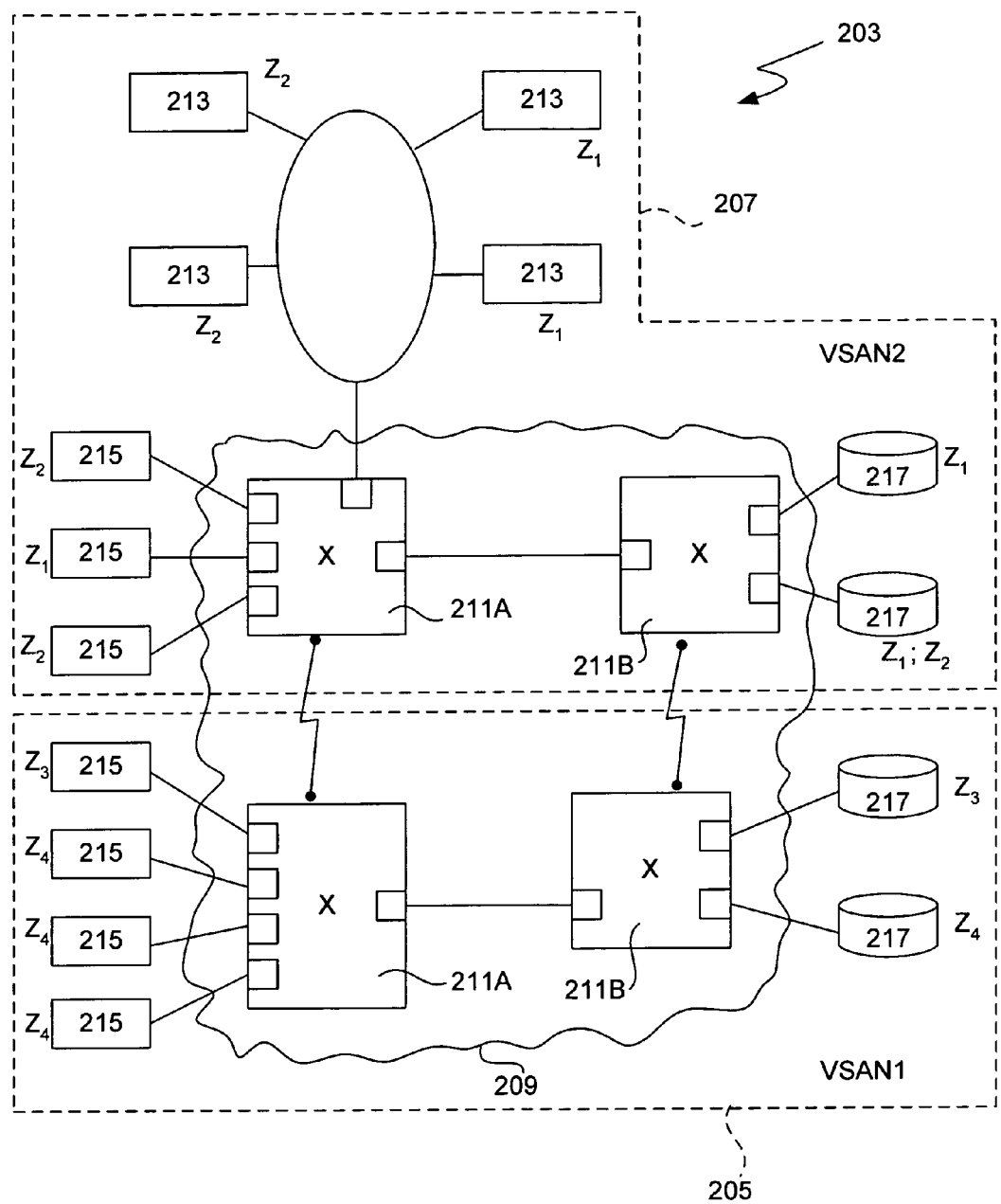
FIG. 2 depicts a storage area network topology divided into multiple VSANs.

As shown in FIG. 2, the concept of zoning can be extended to a more complex situation employing Virtual Storage Area Networks (VSANs). In general, a VSAN applies virtualization to divide a single physical storage area network into two or more virtual networks, each having its own SAN resources such as a zone server, a name server, etc. VSANs provide isolation among devices that are physically connected to the same fabric, in effect creating multiple logical SANs over a common physical infrastructure. This partitioning of fabric services reduces network instability by containing fabric reconfigurations and error conditions within an individual VSAN. Should a fabric function such as Fabric Shortest Path First (FSPF) have a failure, the failure is contained to the VSAN and has no effect on the rest of the switch. VSANs provide the same isolation between individual VSANs as would exist between physically separated SANs. Because each VSAN possesses its own zoning service, zoning is configured within each VSAN independently and has no affect on any other VSAN and zoning service. VSANs and virtualization are further described in the following US Patent Applications, each of which is incorporated herein by reference for all purposes: U.S. patent application Ser. No. 10/056,238 filed Jan. 23, 2002 by Gai and Edsall (US Patent Publication No. US-2003-0172149-A1), U.S. patent application Ser. No. 10/242,374 filed Sep. 11, 2002 by Chandrasekaran et al., and U.S. patent application Ser. No. 10/045,883 filed Jan. 9, 2002 by Kumar et al. (US Patent Publication No. US-2003-0131182-A1).

In FIG. 2, a storage area network 203 includes a physical topology divided into two separate VSANs (a VSAN 1 identified by reference number 205 and a VSAN 2 identified by a reference number 207) and four separate zones (Z1, Z2, Z3, and Z4). The physical topology of SAN 203 includes a fabric 209 made up of two separate Fibre Channel switches 211A and 211B. For ease of illustration each of these is shown twice, once in each VSAN; however, they represent the same physical switches. In addition, SAN 203 includes hosts 213 and 215 and storage devices 217. Hosts 213 participate in an arbitrated loop and are attached to a single FL_port on one of the switches. The remaining hosts 215 are attached to the fabric switches via conventional Fibre Channel F_ports. The individual switches of fabric 209 are connected to one another via E_ports. Finally, the individual storage devices 217 communicate with the switches 211 of fabric 209 via conventional Fibre Channel F_ports.

As indicated, the physical topology 203 is divided into two separate VSANs (VSAN 1 and VSAN 2), each of which comprises various hosts and storage devices. Note, for example, that VSAN 2 includes all of the loop hosts 213 and three of the non-loop hosts 215. It also includes two of the storage devices 217. VSAN 1 includes the remaining four non-loop hosts 215 and two storage devices.

Two zones exist within VSAN 1 and another two zones exist within VSAN 2. The zones in VSAN 1 are identified by Z3 and Z4, while the zones within VSAN 2 are identified as Z1 and Z2. Within VSAN 2, the hosts and storage devices belonging to zone 1 are indicated by the identifier Z1, while the hosts and storage devices belonging to zone 2 are indicated by the identifiers Z2. As shown, most of the hosts and storage devices belong to only a single zone. However, storage device 217' belongs to zones Z1 and Z2. All storage devices and hosts of VSAN 1 belong to either zone 3 or zone 4 alone.

Zoning is typically implemented within the individual switches of a Fibre Channel fabric. Zoning logic may be implemented separately on each port of a switch, or for groups of ports on the switch. A particular challenge arises because there may be a very large number of source-destination combinations that must be accounted for to effectively implement complete zoning. With arbitrated loop designs, for example, it is possible that a single switch will support tens or even up to a hundred separate devices. These hosts may wish to communicate with many different storage devices on the storage area network. There may be tens or hundreds of such storage devices that must accounted for. Some hosts are permitted to communicate with some storage devices but not other storage devices as defined by the appropriate zoning rules. A switch must be able to efficiently determine whether an incoming frame should be permitted to pass to its intended destination based upon applicable zoning rules. To do so, the zoning logic in the switch must account for all possible combinations of source and destination on the storage area network.

Some switches have employed content addressable memory (CAM) to implement zoning logic. The content addressable memory includes separate entries for each possible combination of source and destination that might be encountered on the particular storage area network or Virtual Storage Area Network. After identifying the CAM entry for the source-destination combination encountered in a particular frame, the CAM returns a hit index to access a "result memory" associated with the CAM. The result memory contains separate entries, one for each hit index (therefore one for each source-destination combination). Each entry in the result memory specifies a particular zoning rule (either permit or deny).

Figure 3:
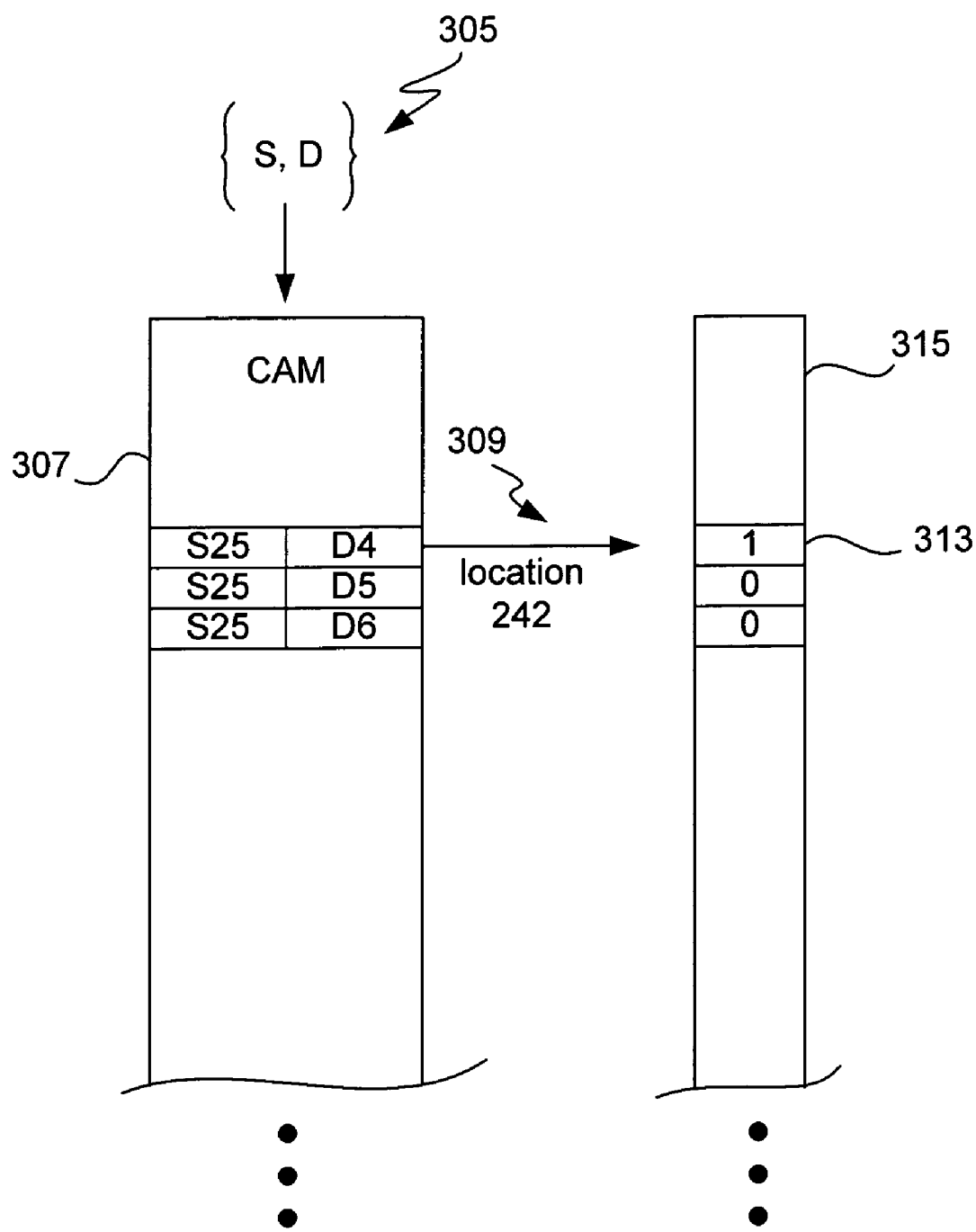
FIG. 3 depicts a content addressable memory with separate entries for each source-destination combination available on a Fibre Channel network.

The basic architecture of such zoning engine is depicted in FIG. 3. As shown there, the source ID and the destination ID (reference numeral 305) of a frame under consideration are used to enter a zoning engine CAM 307, which contains a separate entry for each and every fc_sid-fc_did (Fibre Channel source ID—destination ID) pair in the storage area network. The CAM 307 is searched through for the ID pair and returns an address or "hit index" 309 corresponding to the location of the ID pair. In the example of FIG. 3, the hit index is given by the location 242. This value is used, in turn, to access a result memory 315, which stores zoning rules for each source ID-destination ID pair. In the depicted example, a zoning rule 313 (permit frame transfer) corresponds to hit index value 242.

In the case of a typical TCAM, the needed size and power consumption of the device can be prohibitive. As an example, to support zoning between 512 Fibre Channel destination IDs and 512 Fibre Channel source IDs requires a 256 k×48 TCAM. The size of this TCAM in IBM cu-08 technology is 493 mm$^2$, which is much larger than the size of a typical processor that would be used to control a high performance Fibre Channel switch. Note that TCAM or ternary CAM is a special form of memory, which is relatively expensive and consumes significantly more power than many other forms of memory. However, other forms of CAM will still impose significant space, cost, and power requirements.

To address these difficulties, a zoning engine design may divide the zoning enforcement process into two components, one for processing the destination ID and the other for processing the source ID. By separating these two components, the amount of CAM devoted to zoning enforcement can be greatly reduced. Further, the zoning engine may employ equivalency classes to group source IDs that are equivalent in their zoning implementation. An equivalency class is a group of Fibre Channel source IDs that have the same zoning rule for all Fibre Channel destination IDs across the network. Maintaining a single zoning rule for the equivalency class-destination ID combinations instead of the source ID-destination ID combinations can greatly reduce the number of bits required for the result memory or other medium where the specific zoning rules are maintained.

Zoning logic can be implemented in various locations in a storage area network. It can be implemented in each port of a switch or it can be implemented in a zoning engine that supports multiple (or all) ports on a given switch. Further, the zoning logic can be implemented on either ingress or egress ports of a switch fabric.

Figure 4:
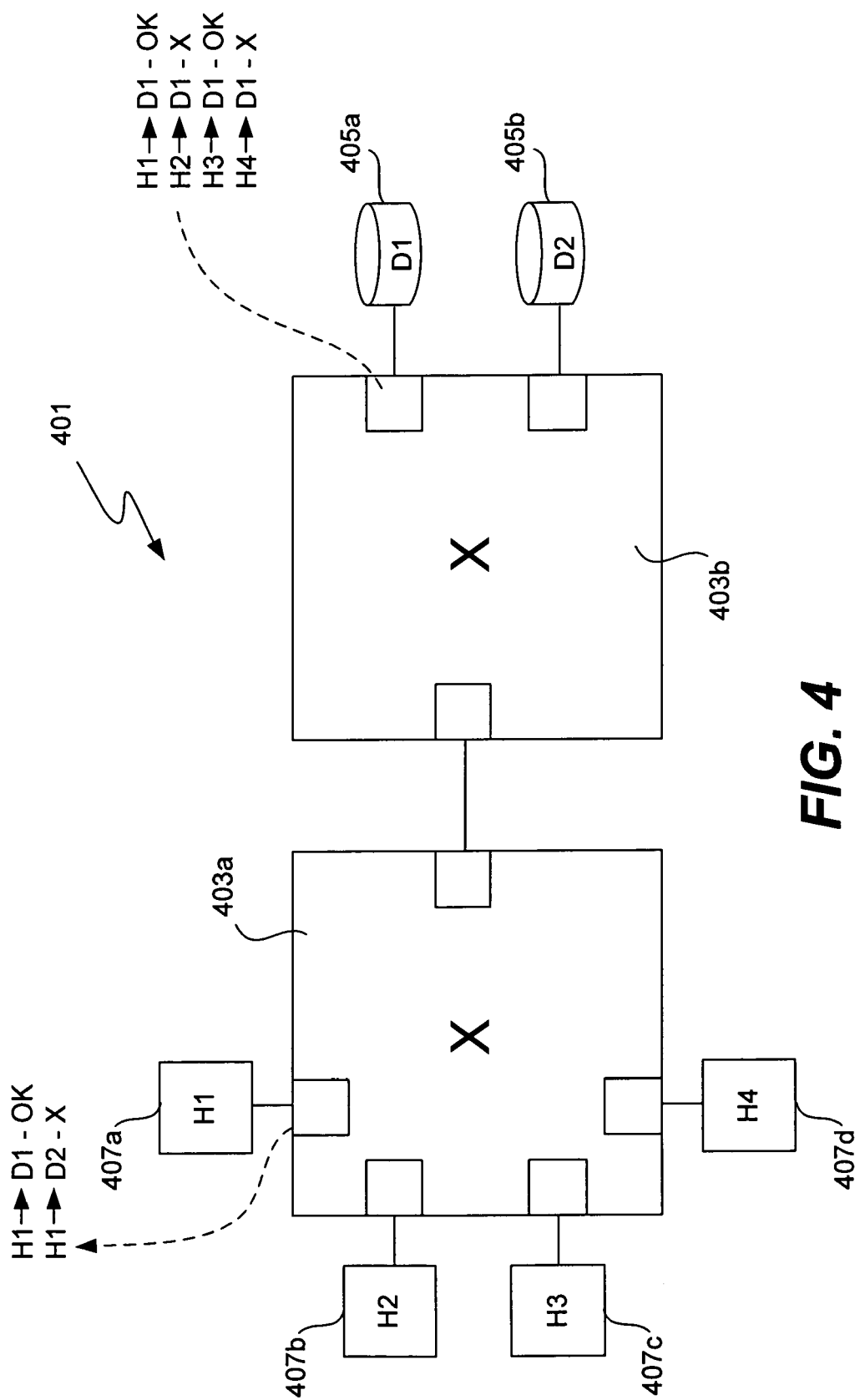
FIG. 4 depicts the effects of implementing zoning logic at ingress and egress points on a network.

As shown in FIG. 4, a storage area network 401 includes two switches 403a and 403b, two storage disks 405a and 405b, and four hosts 407a-407d. Each host and each disk communicates with a switch via an F_port. When the hosts are sources and the disks are destinations, ingress ports are located on switch 403a and egress ports are located on switch 403b. Zoning implemented on the ingress ports of switch 403a requires only two rules on each port (e.g., H1→D1 and H1→D2). Zoning implemented on the egress ports of switch 403b requires four rules on each port (e.g., H1→D1, H2→D1, H3→D1, and H4→D1). In many situations, such as those depicted here, when the zoning logic is implemented on each separate port (or even over a few grouped ports), the number of entries in memory is limited to the number of possible destinations (e.g., storage devices) times the number of hosts supported by the zoning engine at ingress.

A feature that can militate in favor of ingress implementation (in certain embodiments) is the fact that egress implementations take place only after a frame has traveled through the fabric, most of the way to its destination. If a particular frame then has to be dropped because it does not comport with a particular zoning rule, it has already traveled through the network and consumed a certain amount of bandwidth. Obviously, from the perspective of network performance, it will often be preferable to implement zoning rules at ingress points on the network. Of course, there may be certain situations where congestion and bandwidth are not of primary concern. In these situations, it may be desirable for other reasons to implement zoning logic at egress points on the network.

Figure 5:
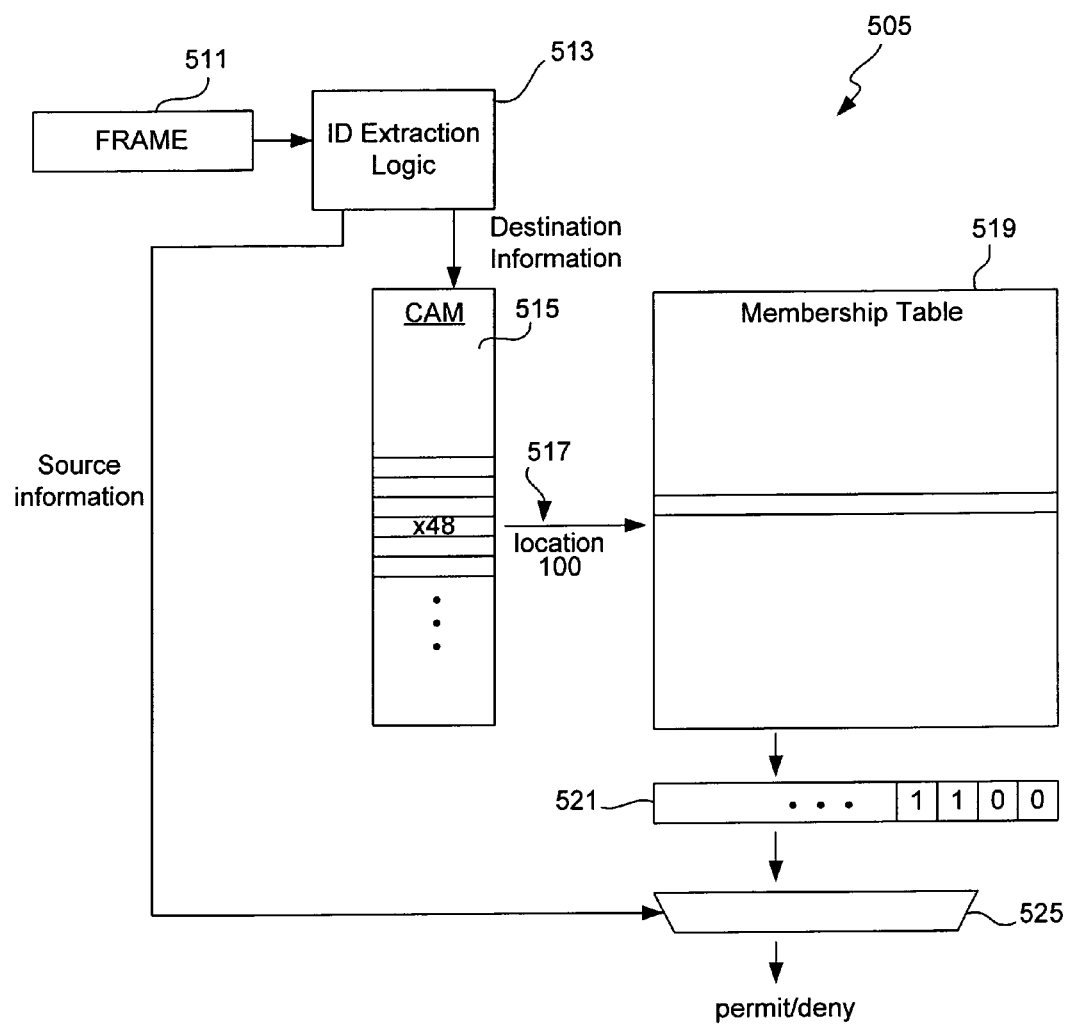
FIG. 5 is a block diagram depicting some features of a zoning engine in accordance with an embodiment of this invention.

FIG. 5 depicts an embodiment of a zoning engine employing significantly smaller content addressable memory than required in some implementations, such as that depicted in FIG. 3. In the depicted embodiment, the CAM need only be sufficiently large to provide entries for all possible destination IDs, as opposed to all possible source-destination combinations on a network. In the depicted embodiment, the CAM is referred to as a "destination zone CAM." An associated result memory (referred to here as a "membership table") contains the rules for all possible source IDs. Each destination on a storage area network has a separate entry in the membership table. Entry to the membership table is through the destination zone CAM. Each entry in the membership table is a "zoning decision vector," which provides a separate decision for each source ID in the network. Application of the source ID to the system is provided via separate path, which controls selection of a particular source-destination rule from the appropriate zoning decision vector in the membership table.

As shown in FIG. 5, an incoming frame 511 is analyzed by a zoning engine 505 to determine whether to permit forwarding to the intended destination. Initially, logic 513 for extracting source and destination IDs (or portions thereof) extracts the relevant ID information and provides it to other components of zoning engine 505. The destination ID is provided to a destination zone CAM 515, which contains a separate entry for each possible destination ID of incoming frames. As shown in the depicted example, destination zone CAM 515 has an entry x48, which corresponds to the destination ID of incoming frame 511. Within CAM 515, this address entry provides a hit index 517, which specifies, in this example, a location 100. The hit index 517 provides entry into a result memory 519, which as indicated is sometimes referred to as a "membership table". It contains a separate entry for each destination address provided in CAM 515. Each of the entries is provided in the form of a vector, with each position of the vector representing a different source ID. See item 521, which depicts an example of such vector. Each position in vector 521 represents a different host (source) and has a value of 1 or 0 corresponding to the zoning rules permit and deny. Thus, each value in the zoning vector represents the zoning rule for a combination of the destination associated with the vector and one of the sources on the network.

The particular location in the vector (i.e., the zoning rule) is selected by multiplexing logic 525, which receives the source address or relevant portion thereof from logic 513. Depending on the physical and virtual topology of the storage area network, different pieces of information may be required to uniquely identify the source ID. For example, if the zoning engine 505 supports multiple FL_ports, the port ID is provided together with the ALPA (arbitrated loop port address) field of the source address for the loop device to uniquely identify the hosts. If VSANs are supported, a VSAN identifier may be required as well to uniquely identify the source for purposes of obtaining the correct zoning rule. A VSAN identifier may also allow zoning on E_ports that send/receive traffic for multiple VSANs.

Regarding addresses, in Fibre Channel, each device (hosts, storage devices and switches) is identified by a unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel port of each end device (hosts and storage devices) is addressed via a three (3) byte Fibre Channel address (or fc_id), allocated dynamically to the end devices by the Fabric. In loop devices, the last byte is the ALPA. In certain embodiments, the Fibre Channel source ID (fc_sid) and Fibre Channel destination ID (fc_did) are used by a zoning engine to implement zoning rules.

Figure 6:
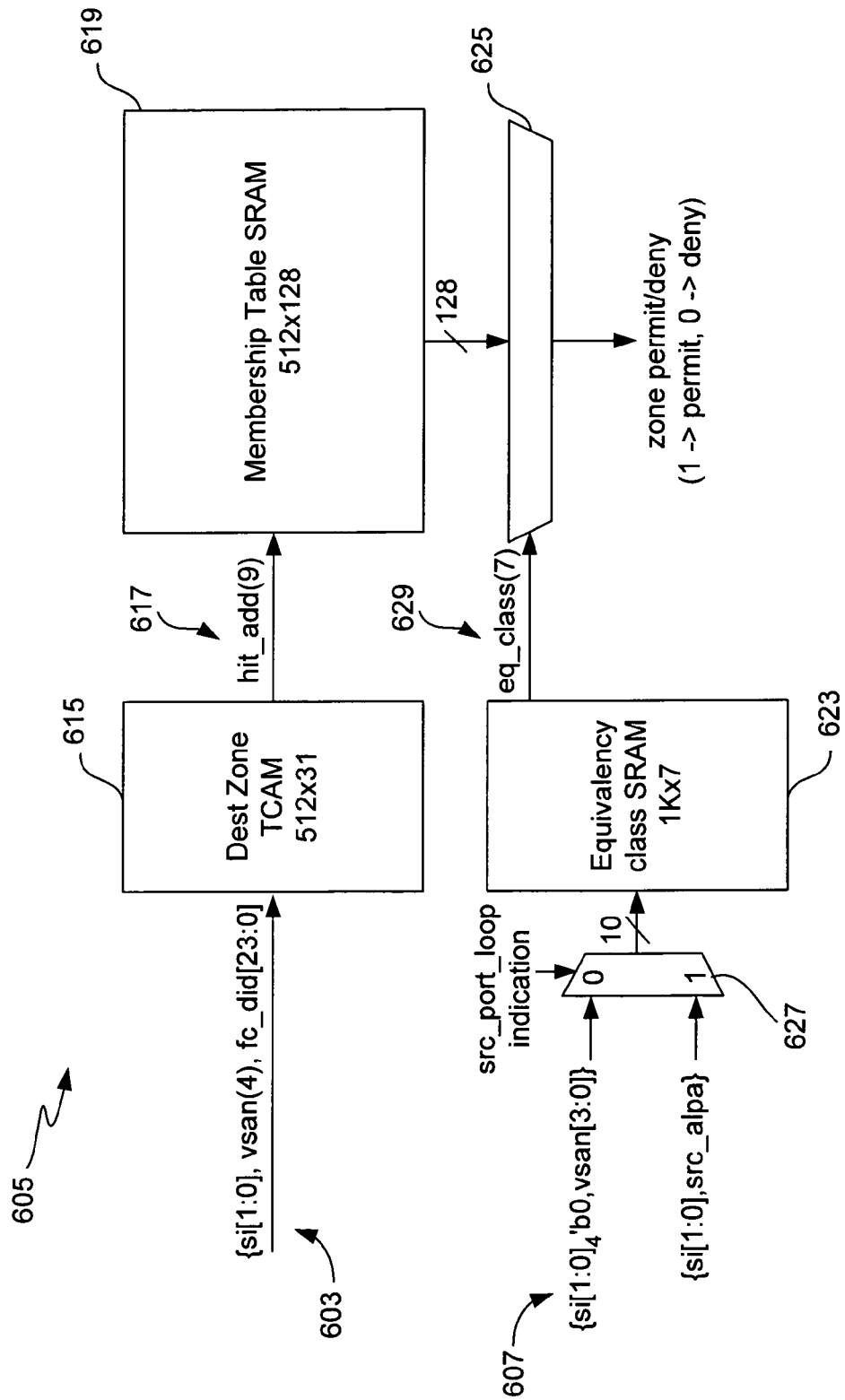
FIG. 6 is a block diagram depicting some features of a zoning engine in accordance with another embodiment of this invention.

FIG. 6 presents another embodiment of the invention. This embodiment is somewhat similar to the one depicted in FIG. 5, but additionally makes use of "equivalency classes." As explained, an equivalency class is a group of source IDs (e.g., fc_sids) that have the same zoning rule for all destination IDs (e.g., fc_dids) across the storage area network. Use of equivalency classes allows for smaller zoning decision vectors and consequently smaller membership tables and result memories. As shown in FIG. 6, frame information 603 is provided to a destination zone CAM 615 of a zoning engine 605. Information 603 includes the identification of the port from which the frame in question was received ("si[1:0]"), the VSAN number of the frame, and the Fibre Channel destination ID. Note that zoning engine 605 may support one or more separate ports on a switch and si[1:0] may be employed to uniquely identify which port of the engine originated the frame.

Destination zone CAM 615 distinguishes unique destinations on the network. In certain embodiments, it includes a separate entry for each distinct destination on the network, which may belong to distinct VSANs implemented on the physical network. Hence, to uniquely identify the frame destination in this embodiment, zoning engine 605 requires both the identification of the destination ID as well as the VSAN on which that destination node resides. The si number (originating port) in frame data 603 is not technically necessary to select the proper destination in CAM 615. The si number is provided in the depicted embodiment to support statistic counters on a per si-destination ID basis.

In the depicted embodiment, destination zone CAM 615 is a 512 by 31 bit TCAM device. Thus, it will support the zoning on storage area networks having up to 512 distinct destination IDs. If storage area networks ever grow larger than this, it will be a simple matter to scale the destination zone memory 615 to accommodate larger numbers of destinations. In a general embodiment, the depth of CAM 615 is a function of the number of destination IDs supported. Each of the 512 distinct destination entries in CAM 615 will be wide enough to uniquely identify at least the destination of a frame under consideration.

After destination information 603 from a frame is used to enter CAM 615, the location of that destination in CAM 615 is provided as a hit index 617, which is used to access a membership table 619. In the specific embodiment depicted in FIG. 6, membership table 619 is implemented as 512 by 128 bit SRAM that serves as the result memory for CAM 615. The 512 entries in membership table 619 correspond to each of the 512 unique destinations provided in CAM 615. Each of these entries is 128 bits wide and used to store a zoning decision vector for the associated destination. As explained above, a zoning decision vector provides a set of permit/deny decisions ("zoning decisions") for the various sources that may attempt to send a frame to the destination on question. In general, the width of the membership table is a factor of the number of ports supported by the zoning engine.

At this point, application of equivalency classes will be discussed. As mentioned, an equivalency class is a group of sources or source IDs that have the same set of zoning rules for all destinations on the network. In the depicted embodiment, grouping of sources into equivalency classes is provided in an equivalency class memory 623. In the depicted embodiment, memory 623 is implemented as a 1K by 7 bit SRAM. Source information taken from the incoming frame is provided to equivalency table 623, which identifies the equivalency class for the frame. The equivalency class is used to index into the zoning decision vector selected from membership table 619 (by way of the hit index from CAM 615) to obtain the specific zoning permit/deny decision for the frame in question. By grouping storage IDs with the same zoning decisions for all destination IDs in the network into equivalency classes, the invention allows maintenance of smaller zoning decision vectors and associated smaller membership tables. Hence, the 128 bit wide zoning decision vectors of membership table 619 may actually provide zoning rules for considerably more than 128 distinct sources. In other words, membership table 619 can support 128 distinct "groups" (e.g., equivalency classes) mapped from unique source IDs on the network. In a general embodiment, the depth of the equivalency memory is a factor of the number of ports supported by the zoning engine.

Utilization of the membership table and equivalency table may depend on the type of source devices that are connected to the network. If non-looped devices are attached, then each F_port is associated with only a single Fibre Channel source ID. If a zoning engine is implemented to support four F_ports then, the engine need only support four distinct Fibre Channel source IDs using only four equivalency table entries and at most four columns of the membership table. If, however, loop devices are attached to switch ports then, per the relevant standards defining loop devices, each FL_port could be associated with up to 128 Fibre Channel source IDs. This could require as many as 512 (128×4) equivalency table entries.

If equivalency classes were not used in this situation, the membership table would also have to be 512 bits wide. However, in the depicted implementation of FIG. 6, it is assumed that the maximum number of supported source IDs can be condensed down to a much smaller number of equivalency classes, e.g., 128 equivalency classes in the depicted embodiment. This is not an unreasonable assumption. Typically, in a Fibre Channel network, when nodes are attached to a switch in a loop, all the individual nodes in a group have the same zoning rules with respect to the nodes in the network. In such cases, all devices (sources) on the loop can be grouped into a single equivalency class. Hence, for many embodiments, 128 separate equivalency classes should be more than sufficient to support up to 512 looped devices (Fibre Channel source IDs).

Returning to FIG. 6, source information 607 is extracted from the incoming frame and provided to a multiplex logic 627, which selects a data input channel on the basis of whether a port loop is indicated. If a loop is indicated, then the relevant data from the frame includes the si number and the arbitrated loop port address (ALPA) of the Fibre Channel source ID for the loop device sending the frame. If a port loop is not indicated, then the relevant frame data includes the si number and a VSAN identifier. As explained, a VSAN identifier may enable zoning on E_ports based on VSAN number. The source data 607 is provided via multiplex logic 627 to the equivalency class memory 623, where the source is mapped to a particular equivalency class. The resulting equivalency class 629 is provided to multiplex logic 625, which uses the equivalency class to select the appropriate rule from the zoning decision vector associated with the destination ID identified using destination zone CAM 615.

One advantage of this approach is a reduction in the size of the result memory 619 by an amount equal to the difference between the number of sources and the number of equivalency classes. Another way to look at this is that, for a given memory size, the zoning engine supports a greater number of sources and destinations on the network. Using memory devices of the sizes described here, a single zoning engine can easily support four separate F_ports, even if one or more of these ports support arbitrated loops.

Regarding zoning in the context of VSANs, in most cases the port identification (si number) will correspond to a single source VSAN. So use of the si number may be viewed as sufficient to enter the equivalency memory. However, in certain embodiments, a frame received on a particular si (port) can go through other functional blocks before being processed by a zoning engine. The preceding functional blocks can rewrite the frame with a different VSAN and DID that the received frame's original VSAN and DID. Hence, in certain embodiments, only the VSAN and DID can identify a unique destination and the use of si along with DID is not sufficient. One example of a preceding block is a block that implements routing functionality. A routing function may transport a frame from one VSAN to another VSAN. Another context where a frame's VSAN is important to zoning is where zoning rules are applied on trunk ISLs (Inter Switch Links) via an E_port for example. In some cases, a trunk ISL can carry traffic from multiple VSANs. Hence to uniquely identify the frame destination in such cases, the zoning engine requires both the identification of the destination ID as well as the VSAN on which that destination node resides.

Figure 7:
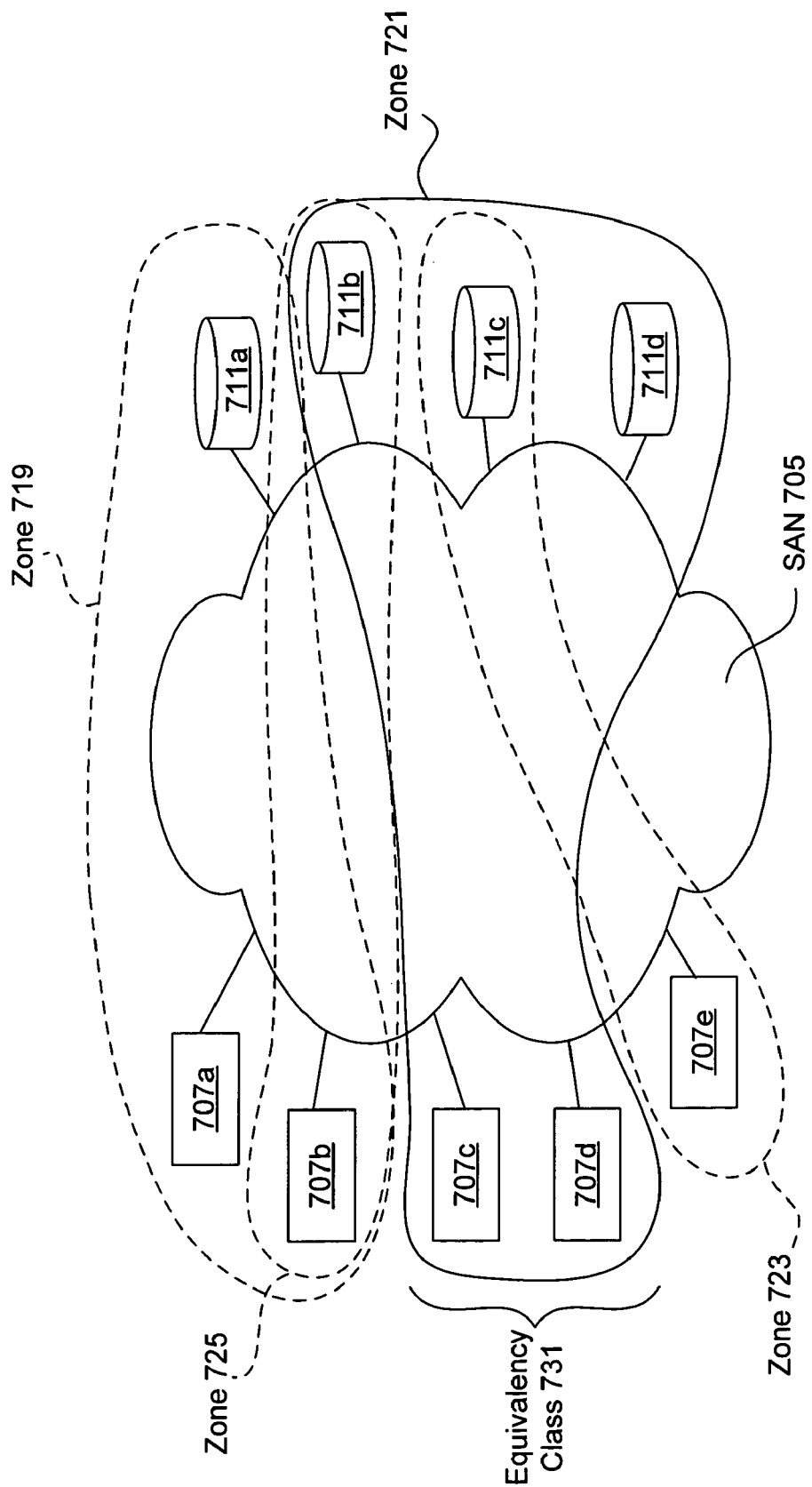
FIG. 7 depicts a storage area network comprising multiple zones and equivalency classes.

The concept of an equivalency class is further illustrated in FIG. 7. As shown there, a storage area network 705 includes five hosts 707a-707e (sources) and four storage disks 711a-711d (destinations). SAN 705 is divided into four zones: a first zone 719 including hosts 707a and 707b together with disk 711a, a second zone 721 including hosts 707c and 707d together with disks 711*b* through 711*d*, a third zone 723 including only hosts 707*e* and disk 711*c*, and finally a fourth zone 725 including only host 707*b* and disk 711*b*. In this example, there is only one equivalency class that condenses multiple sources; specifically, an equivalency class 731 that includes hosts 707*c* and 707*d*. By virtue of the zoning rules, these two hosts are permitted to communicate with disk 711*b* through 711*d* but not communicate with disk 711*a*. Note that while hosts 707*a* and 707*b* both belong to zone 719, they are not in the same equivalency class because only hosts 707*b* also belongs to zone 725, and can thereby communicate with disk 711*b*.

Due to equivalency class 731 shown in FIG. 7, the corresponding zoning decision vectors of the membership table need only have four elements, as opposed to the five elements that would be required if each source had to be separately considered.

Figure 8:
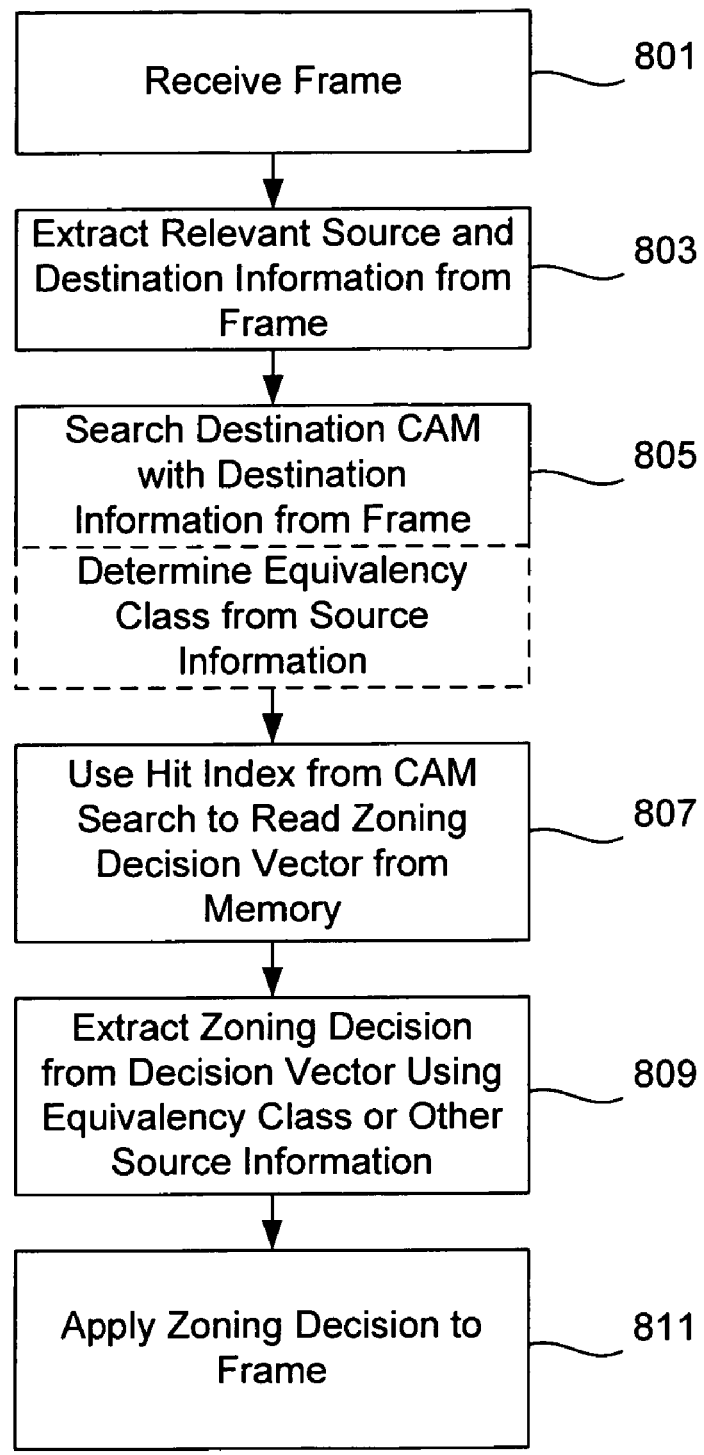
FIG. 8 is a process flow diagram depicting one zoning method in accordance with an embodiment of this invention.

FIG. 8 shows at a high-level a process for the zoning engines as provided in certain embodiments. As shown, the process begins at a block 801 where a frame subject to zoning is received. Initially, the information relevant to a zoning decision is extracted from the frame. See block 803. Such information includes, for example, source and destination IDs, membership in a VSAN, if any, and a port from which the frame was received (e.g., the "si" parameters discussed above). Depending on the configuration of the port and source devices, the source port can be used in lieu of the source ID, or a combination of the port and the ALPA for a Fibre Channel loop device can be used. The relevant information extracted in block typically can be obtained from the frame header.

Next, at a block 805, the process searches through a destination CAM with the destination ID or other destination information in order to obtain a CAM hit index corresponding to the frame destination. Contemporaneously, the process applies the source ID or other source information to determine an equivalency class to which the source belongs, if any. The process may apply certain checks, not shown, such as whether the destination information misses all CAM entries and whether the source information provides a valid class or other value.

As shown at a block 807, the process employs the CAM hit index obtained at block 805 to read a zoning decision vector from, e.g., a membership table. Next, as shown in a block 809, the process extracts the appropriate zoning decision (for the frame under consideration) from the vector using the equivalency class or other source information provided via block 805. The zoning decision is then applied to the frame and the process is complete. See block 811. The process may also perform various statistical counts, tallies, etc., not shown.

As indicated above, zoning may be implemented by "zoning engines" responsible for detecting and/or enforcing zoning rules in a storage area network. In a specific embodiment described above, a single zoning engine supports four distinct F_ports on a given switch, each of which may or may not support loop devices. It is also possible that the invention could be implemented on other ports such as N_ports of hosts and disks or E_ports, which handle inter-switch links on Fibre Channel switches. Further, it is possible that the invention could be implemented on other devices associated with the storage area network (e.g., an administration or management console) or could be implemented on the ports themselves, as opposed to some other region of the switch (or other node) located outside of the port logic.

Each switch or other node implementing zoning employs zone configuration data in the form of destination CAM entries, zoning vectors in membership tables, equivalency groups in equivalency tables and any other resources required by the zoning engines. This data is configured when the physical network and virtual network topologies are established and at other times when the network topology and settings are modified. Zone administration is a significant aspect of maintaining a complex network. Whenever the needs of the network change, the administrator may need to modify or redefine the zone structure enforced by the Fabric. This may happen when, for example, a device is added to a SAN or removed from it, or when a specific device, such as a tape drive, has to be accessed by different hosts at different times. Typically, the administrator accomplishes the administration task using a management application running over one of the hosts connected to the SAN. The management application sends requests to a generic function provided by the Fibre Channel Fabric called "Management Service", which enables the management of the entire Fabric. Through this, administrator level zoning decisions are converted to appropriate configuration data and configuration settings for the destination CAMs, membership tables, and (if employed) equivalency tables on the various network nodes.

The management service software may be deployed on any machine having access to a network where zoning is implemented. It may run a special management console or other machine, which may be a host, switch or other device on the networks.

Generally, the zoning engine designs may be implemented on hardware, possibly in conjunction with software or firmware. Implementation of the designs may be provided on a network device designed to handle network traffic, such as, for example, a router or a switch, particularly a Fibre Channel switch. Such network devices may have multiple network interfaces including Ethernet, frame relay, and ISDN interfaces, for example.

Zoning engines described herein may be implemented in specially configured network devices such as the MDS 9000 family of switches manufactured by Cisco Systems, Inc. of San Jose, Calif. A generalized architecture for some such machines will appear from the description given below. Further, the invention may be at least partially implemented on a card (e.g., an interface card) for a network device or a general-purpose computing device.

Figure 9:
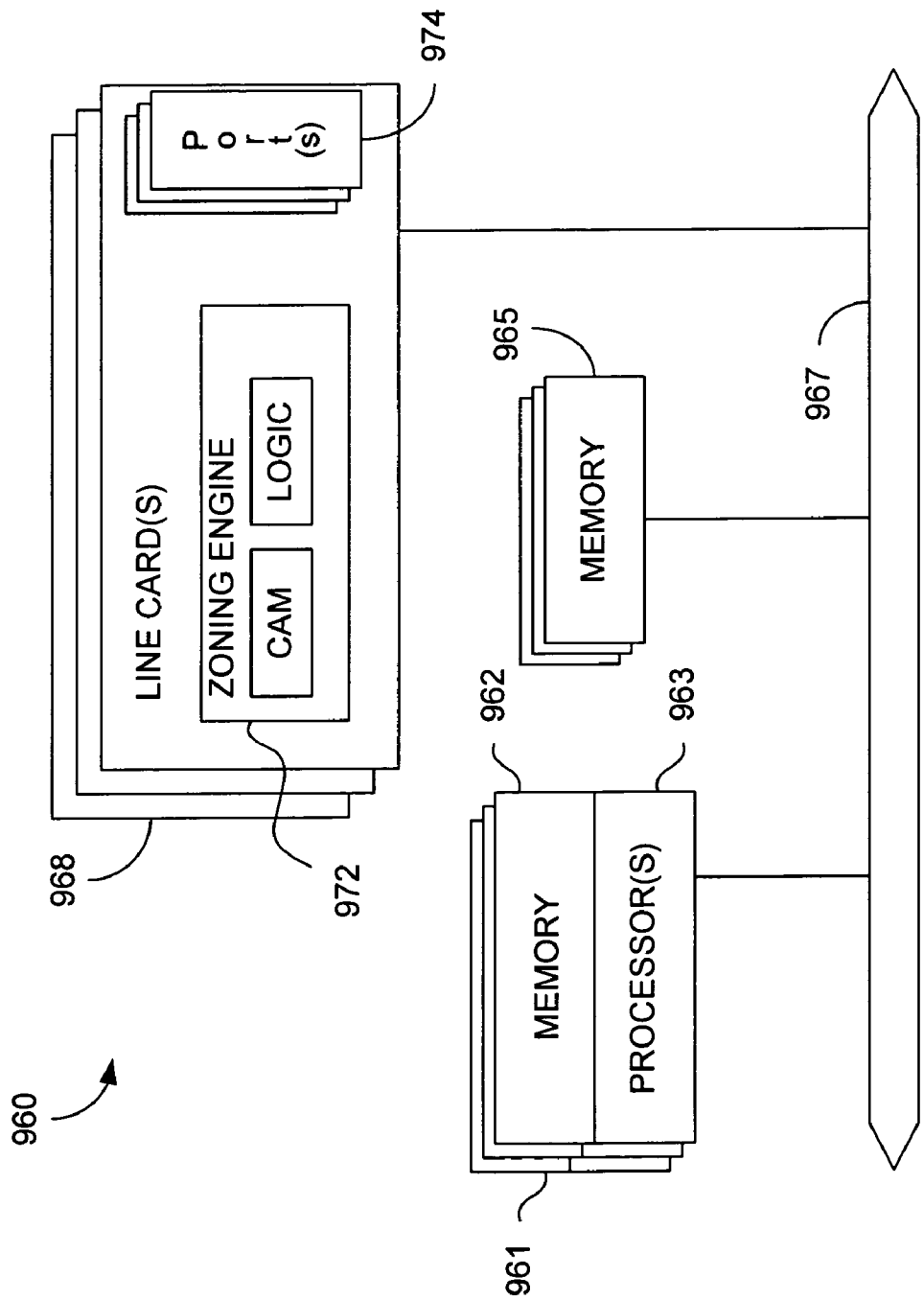
FIG. 9 depicts a switch or other network device that may be configured to perform the methods of the present invention.

Referring now to FIG. 9, a network device 960 suitable for implementing the techniques of the present invention includes a master central processing unit (CPU) 962, interfaces 968, and a bus 967 (e.g., a PCI bus). When acting under the control of appropriate software or firmware, the CPU 962 may be responsible for implementing specific functions associated with the functions of a desired network device. For example, the CPU 962 may be responsible for analyzing frames, encapsulating frames, and forwarding frames for transmission on an inter-switch link. The CPU 962 preferably accomplishes all these functions under the control of software including an operating system (e.g. Windows NT), and any appropriate applications software such as Cisco System's IOS.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

The interfaces 968 are typically provided as interface cards (sometimes referred to as "line cards"). Generally, they control the sending and receiving of data packets over the network and sometimes support other peripherals used with the network device 960. Among the interfaces that may be provided are Fibre Channel interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

As shown at least some line cards 968 have a zoning engine 972 (and possibly additional zoning engines, not shown) that control zoning on one or more ports 974. Each zoning engine in this embodiment contains a CAM 976, logic, and other features such as described above.

Although the system shown in FIG. 9 illustrates one specific network device, it is by no means the only network device architecture on which the zoning engines described here can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention also relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; semiconductor memory media; and hardware devices that are specially configured to store and perform program instructions, such as read-only memory devices (ROM) and random access memory (RAM). The invention may also be embodied in program instructions on a carrier wave traveling over an appropriate medium such as airwaves, optical lines, electric lines, etc. Examples of program instructions include both machine code, such as produced by a compiler, and files containing higher level code that may be executed by the computer using an interpreter.

Other Embodiments

While the invention has been particularly shown and described with reference to specific embodiments thereof, it will be understood by those skilled in the art that changes in the form and details of the disclosed embodiments may be made without departing from the spirit or scope of the invention. For instance, while the above protocol has been described for implementation on Fibre Channel switches applications, it may be easily extended to allow implementation on other devices including non-Fibre Channel devices that support zoning. Considering these and other variations, the scope of the invention should be determined with reference to the appended claims.

What is claimed is:

1. A network device for use in a Fibre Channel network, the network device comprising:
   one or more Fibre Channel ports; and
   a zoning engine for implementing zoning in the Fibre Channel network, the zoning engine comprising:
      (a) a content addressable memory configured or designed to store information identifying distinct destinations on said Fibre Channel network and locations in a membership table for zoning decision vectors for the distinct destinations;
      (b) a membership table designed or configured to store the zoning decision vectors for the distinct destinations identified in the content addressable memory, wherein each zoning decision vector is associated with a single destination and multiple available sources for said single destination on the Fibre Channel network and comprises a separate zoning rule for each combination of source and destination from among said single destination and the multiple sources; and
      (c) logic for (i) selecting a zoning decision vector from the membership table using information obtained from the content addressable memory based on destination information from an incoming frame, and (ii) selecting a zoning rule from the selected zoning decision vector using source information from said incoming frame, wherein selecting the zoning decision vector occurs separately from selecting the zoning rule and wherein the zoning rules in the zoning decision vector indicate whether the frame should be permitted or denied transmission to its destination.

2. The network device of claim 1, wherein the information identifying distinct destinations comprises Fibre Channel destination IDs or a portion thereof.

3. The network device of claim 1, wherein the network device is a Fibre Channel switch.

4. The network device of claim 3, wherein the network device comprises multiple Fibre Channel ports and the zoning engine implements zoning on two or more of the Fibre Channel ports.

5. The network device of claim 3, wherein the zoning engine implements zoning on at least one port that supports an arbitrated loop.

6. The network device of claim 1, wherein the zoning engine implements zoning for one or more Fibre Channel ports at ingress points on the Fibre Channel network.

7. The network device of claim 1, further comprising an equivalency table for mapping individual sources on the Fibre Channel network to equivalency classes, wherein an equivalency class defines a group of sources having the same zoning rule for all destinations across the Fibre Channel network, and wherein the zoning decision vectors specify zoning decisions for the equivalency classes.

8. The network device of claim 1, further comprising logic for obtaining the source information from incoming frames, which logic provides one set of source parameters for loop sources and a second set of source parameters for non-loop sources.

9. The network device of claim 1, wherein the zoning engine logic in (c) is configured to employ membership in a Virtual Storage Area Network as part of the source information and/or the destination information.

10. A method of implementing zoning in a Fibre Channel network, the method comprising:
receiving a Fibre Channel frame and determining source information and destination information from said frame;
using the destination information to identify location information for a zoning decision vector for the destination specified in said frame, wherein the location information is stored in a content addressable memory, and wherein the zoning decision vector is associated with a single destination and multiple available sources for said single destination on the Fibre Channel network and comprises a separate zoning rule for each combination of source and destination from among said single destination and the multiple sources;
identifying the zoning decision vector using the location information obtained from the content addressable memory;
using the source information to identify in the zoning decision vector a zoning rule for the source and the destination specified in said frame, wherein identifying the zoning decision vector occurs separately from identifying the zoning rule and wherein the zoning rules in the zoning decision vector indicate whether the frame should be permitted or denied transmission to its destination; and
applying said zoning decision to said frame.

11. The method of claim 10, wherein determining source information comprises determining whether the source is a loop device.

12. The method of claim 10, wherein the destination information identifies membership of the destination in a Virtual Storage Area Network implemented on the Fibre Channel network.

13. The method of claim 10, wherein the source information identifies membership of a source in a Virtual Storage Area Network implemented on the Fibre Channel network.

14. The method of claim 10, wherein the source information comprises a Fibre Channel source ID and the destination information comprises a Fibre Channel destination ID.

15. The method of claim 10, further comprising determining an equivalency class to which the source belongs, wherein the equivalency class defines a group of sources having the same zoning rule for all destinations across the Fibre Channel network.

16. The method of claim 15, wherein the zoning decision vector specifies zoning decisions for equivalency classes.

17. The method of claim 10, wherein the method is implemented at an ingress port on the Fibre Channel network.

18. A network device designed or configured to implement zoning in a Fibre Channel network, the network device comprising:
means for receiving a Fibre Channel frame and determining source information and destination information from said frame;
means for using the destination information to identify location information for a zoning decision vector for the destination specified in said frame, wherein the location information is stored in a content addressable memory, and wherein the zoning decision vector is associated with a single destination and multiple available sources for said single destination on the Fibre Channel network and comprises a separate zoning rule for each combination of source and destination from among said single destination and the multiple sources;
means for identifying the zoning decision vector using the location information obtained from the content addressable memory;
means for using the source information to identify in the zoning decision vector a zoning rule for the source and the destination specified in said frame, wherein identifying the zoning decision vector occurs separately from identifying the zoning rule and wherein the zoning rules in the zoning decision vector indicate whether the frame should be permitted or denied transmission to its destination; and
means for applying said zoning decision to said frame.

19. A network comprising:
a source for sending frames;
a destination for receiving frames; and
a switch comprising:
(a) a content addressable memory configured or designed to store information identifying distinct destinations on said network and locations in a membership table for zoning decision vectors for the distinct destinations;
(b) a membership table designed or configured to store the
zoning decision vectors for the distinct destinations identified in the content addressable memory, wherein each zoning decision vector is associated with a single destination and multiple available sources for said single destination on the Fibre Channel network and comprises a separate zoning rule for each combination of source and destination from among said single destination and the multiple sources; and
(c) logic for (i) selecting a zoning decision vector from the membership table using information obtained from the content addressable memory based on destination information from an incoming frame, and (ii) selecting a zoning rule from the selected zoning decision vector using source information from said incoming frame, wherein selecting the zoning decision vector occurs separately from selecting the zoning rule and wherein the zoning rules in the zoning decision vector indicate whether the frame should be permitted or denied transmission to its destination.

20. The network of claim 19, further comprising two or more Virtual Storage Area Networks (VSANs) implemented on the network.

21. The network of claim 19, wherein the switch implements zoning at an ingress point on the network.

22. The network of claim 19, wherein the source is an arbitrated loop device.

23. The network of claim 19, wherein the switch further comprises an equivalency table designed or configured for mapping individual sources on the network to equivalency classes, wherein an equivalency class defines a group of sources having the same zoning rule for all destinations across the network, and wherein the zoning decision vectors specify zoning decisions for the equivalency classes.

24. A method of implementing zoning in a network, the method comprising:
(a) sending a frame from a source to an ingress port on a switch, wherein said frame identifies a destination on the network;
(b) making a zoning decision at said switch by
(i) identifying location information for a zoning decision vector for the destination specified in said frame, wherein the location information is stored in a content addressable memory, and wherein the zoning decision vector is associated with a single destination and multiple available sources for said single destination on the Fibre Channel network and comprises a separate zoning rule for each combination of source and destination from among said single destination and the multiple sources;

(ii) identifying the zoning decision vector for the destination specified in said frame using the information obtained from the content addressable memory; and (iii) identifying in the zoning decision vector a zoning rule for the source and the destination identified in the frame, wherein identifying the zoning decision vector occurs separately from identifying the zoning rule and wherein the zoning rules of the zoning decision vector indicate whether the frame should be permitted or denied transmission to its destination; and (c) permitting or denying transmission of the frame to the destination based on the zoning decision identified in (b).

25. The method of claim 24, further comprising determining whether the source is a loop device.

26. The method of claim 24, further comprising determining membership of the source and destination in Virtual Storage Area Networks implemented on the network.

27. The method of claim 24, further comprising determining an equivalency class to which the source belongs, wherein the equivalency class defines a group of sources having the same zoning rule for all destinations across the network.

28. The method of claim 27, wherein the zoning decision vector specifies zoning decisions for equivalency classes.

* * * * *